Oct. 16, 1934.   M. BROWN   1,977,261
ILLUMINATED LICENSE PLATE
Filed Nov. 21, 1933   2 Sheets-Sheet 1
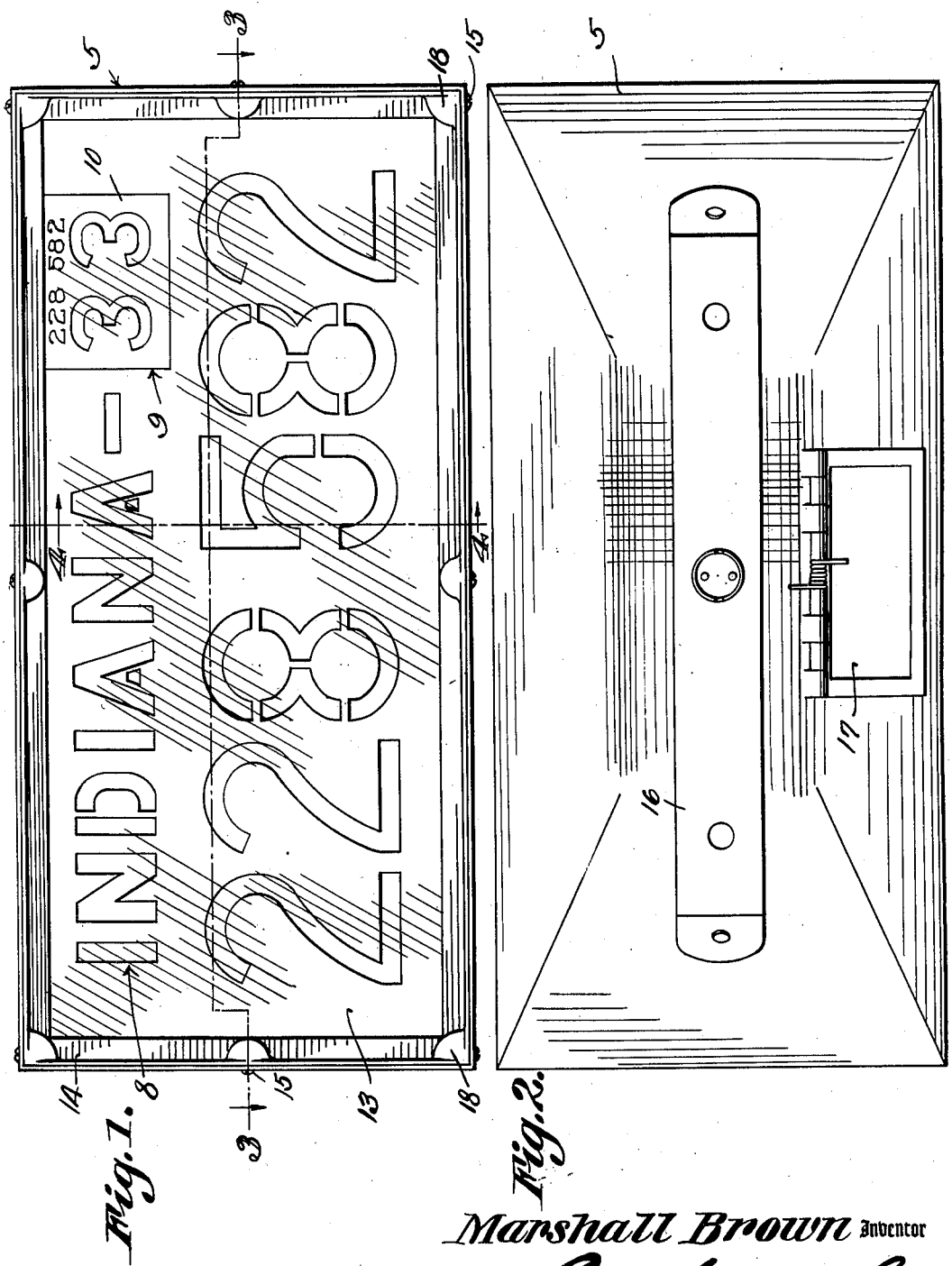
Marshall Brown Inventor
By
Attorneys.

Oct. 16, 1934.  M. BROWN  1,977,261
ILLUMINATED LICENSE PLATE
Filed Nov. 21, 1933  2 Sheets-Sheet 2
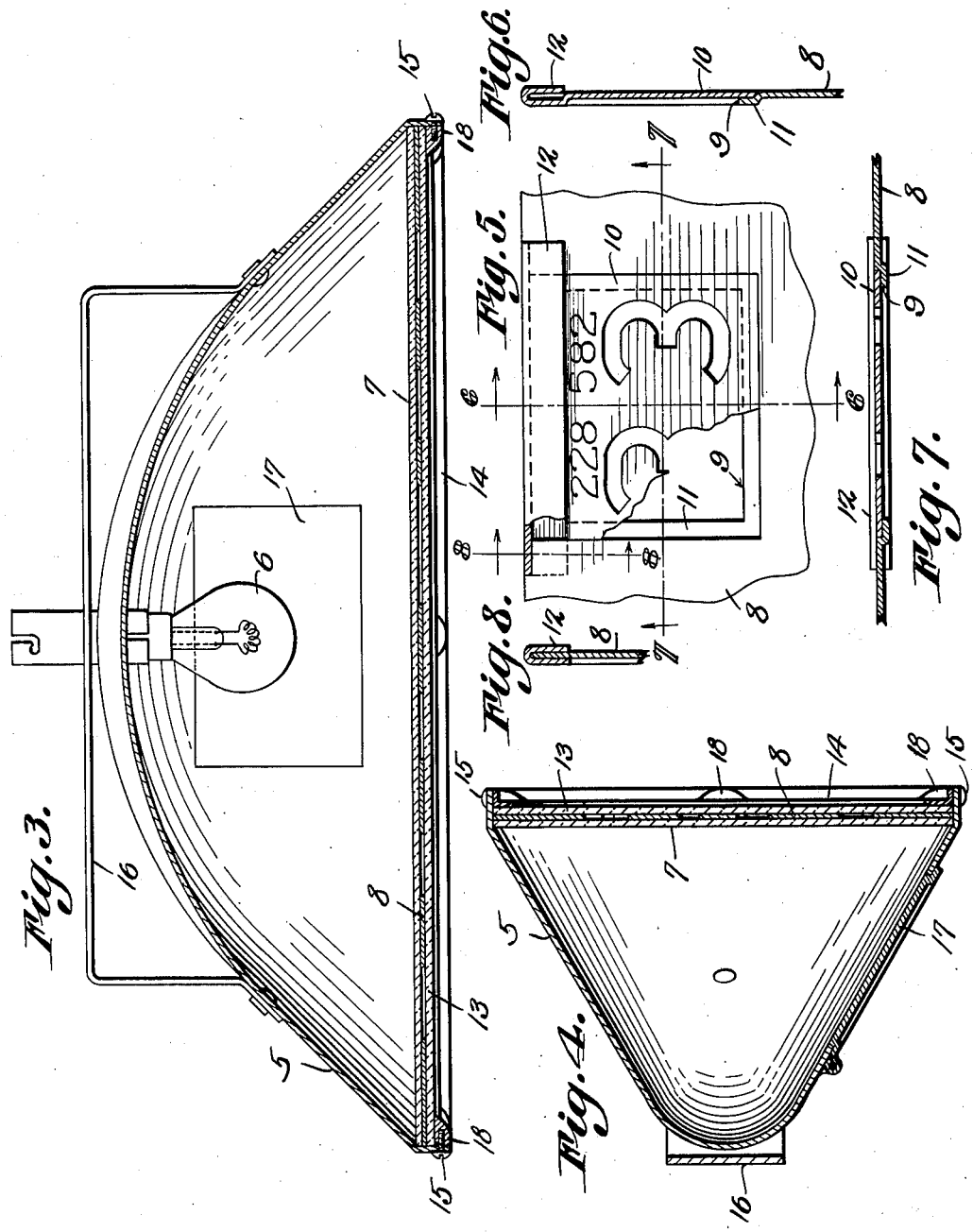
Marshall Brown
Inventor
By C. A. Snow & Co.
Attorneys.

Patented Oct. 16, 1934

1,977,261

UNITED STATES PATENT OFFICE 1,977,261

ILLUMINATED LICENSE PLATE

Marshall Brown, Heltonville, Ind.

Application November 21, 1933, Serial No. 699,056

2 Claims. (Cl. 40—133)

This invention relates to motor vehicle license plates and license plate holders, and more particularly to license plates of the illuminated type.

The primary object of the invention is to provide a license plate having cut out portions outlining certain indicia defining the license number, and the State in which the license is issued.

An important object of the invention is to provide a license plate having a removable section formed with indicia indicating the year of issuance of the license tag.

Another object of the invention is the provision of novel means for securing the removable section of the license plate, in position, to the end that the removable section may be readily removed or positioned by persons unfamiliar with mechanics.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a front elevational view of a device constructed in accordance with the invention.

Figure 2 is a rear elevational view thereof.

Figure 3 is a sectional view taken on line 3—3 of Figure 1.

Figure 4 is a sectional view taken on line 4—4 of Figure 1.

Figure 5 is a fragmental detail view illustrating the removable year plate.

Figure 6 is a sectional view taken on line 6—6 of Figure 5.

Figure 7 is a sectional view taken on line 7—7 of Figure 5.

Figure 8 is a sectional view taken on line 8—8 of Figure 5.

Referring to the drawings in detail, the device comprises a license plate holder including a body portion indicated generally by the reference character 5, the rear walls of the body portion merging into a common center providing a reflector for projecting light rays from the lamp 6, forwardly, through the front of the body portion.

The reference character 7 designates a closure for the body portion, which comprises a length of glass material preferably colored red, when used in the rear or tail light of a license plate housing, but which is preferably colored green when used in a license plate housing at the front of a vehicle.

Positioned directly over the member 7 is the license plate indicated by the reference character 8, which license plate is constructed of sheet metal material provided with cut out portions forming indicia indicating the number of the license plate, and the State in which the license plate is issued.

A cut out portion indicated by the reference character 9 is formed in one corner of the license plate, the cut out portion providing a space for the reception of the substantially small plate 10, that is also formed with cut out portions defining indicia representing the year in which the license plate has been issued.

The plate is also provided with a number corresponding to the number of the license tag with which the plate 10 is used.

In order that the plate 10 may be readily and easily secured or removed, by persons unfamiliar with mechanics, a flange indicated by the reference character 11 is provided, the flange extending inwardly beyond the edge of the cut out portion 9, providing a rest or support for the plate 10.

This plate 10 is provided with a bar 12 secured along its upper edge, the ends of the bar 12 extending beyond the sides of the plate 10, where they contact with the upper edge of the license plate, in a manner as shown by the drawings.

This bar 12 is of a width to permit it to be folded upon itself, providing substantially inverted U-shaped portions that fit over the upper edge of the plate 8.

Thus it will be seen that due to this construction, instead of replacing the entire license plate each year, it is only necessary to replace the plate 10, which of course, will be supplied by the State issuing the license, thereby reducing the cost of licensing motor vehicles, to the minimum.

A length of clear glass indicated by the reference character 13 is positioned over the license plate 8, the license plate and length of glass material being held in position by means of the rectangular frame 14, which is substantially L-shaped in cross section and of a size to exactly fit within the body portion 5. The frame 14 is held in position by bolts 15, which pass into threaded openings formed in the bosses 18, that are an integral part of the frame 14.

At the rear of the body portion, is a bracket 16, formed with openings so that the box-like body portion may be readily secured on the usual license bracket, without the necessity of making alterations in the bracket structure.

In order that ready access may be had to the interior of the body portion, a hinged door or closure 17 is provided in the rear wall of the box-like body portion, as clearly shown by the drawings.

What is claimed is:

1. An illuminated license plate holder comprising an open-ended box-like body portion, a license plate having cut out portions defining indicia, fitted within the body portion, said license plate having a cut out portion formed in one edge thereof and having offset flanges extending into the last mentioned cut out portion providing a support, a removable number plate section fitted in the last mentioned cut out portion and resting on the offset flanges, a supporting strip formed integral with the removable member and adapted to fit over the offset edge of the license plate, and a frame secured within the front of the box-like body portion and engaging the license plate and number plate, securing the license plate and number plate in position.

2. An illuminated license plate holder, comprising an open-ended box-like body portion, a license plate having cut out portions defining indicia, fitted within the body portion, said license plate having a cut out portion extending from a point adjacent to one edge thereof, flanges formed integral with the plate and extending into the cut out portion, said flanges being offset, a removable number plate adapted to fit into the cut out portion and rest on the offset flanges, one edge of the number plate being bent downwardly providing spaced members, the ends of the downwardly bent portion extended beyond the side edges of the number plate, said downwardly bent portions adapted to embrace a portion of the upper edge of the number plate securing the number plate to the license plate, said number plate having cut out portions defining indicia, and a removable frame fitted within the body portion and engaging the license plate and number plate, securing the license plate and number plate in position, and means for illuminating the box-like body portion illuminating the license plate and number plate.

MARSHALL BROWN.